(12) United States Patent
Takayama

(10) Patent No.: US 9,996,406 B2
(45) Date of Patent: Jun. 12, 2018

(54) MACHINING PROGRAM PROCESSING APPARATUS

(71) Applicant: DMG MORI CO., LTD., Nara (JP)

(72) Inventor: Masakazu Takayama, Nara (JP)

(73) Assignee: DMG MORI CO., LTD., Yamatokoriyama-Shi, Nara (JP)

( * ) Notice: Subject to any disclaimer, the term of this patent is extended or adjusted under 35 U.S.C. 154(b) by 0 days. days.

(21) Appl. No.: 15/670,647

(22) Filed: Aug. 7, 2017

(65) Prior Publication Data

US 2017/0337100 A1    Nov. 23, 2017

Related U.S. Application Data

(63) Continuation-in-part of application No. 12/498,921, filed on Jul. 7, 2009, now abandoned.

(30) Foreign Application Priority Data

Jul. 7, 2008 (JP) ................................ 2008-177244

(51) Int. Cl.
  *G06F 9/44* (2018.01)
  *G06F 11/07* (2006.01)
  *G05B 19/042* (2006.01)

(52) U.S. Cl.
  CPC ...... *G06F 11/0736* (2013.01); *G05B 19/0426* (2013.01); *G06F 11/0766* (2013.01)

(58) Field of Classification Search
  CPC ......................................................... G06F 9/44
  USPC .................................................. 717/124–127
  See application file for complete search history.

(56) References Cited

U.S. PATENT DOCUMENTS

| 6,512,961 | B1* | 1/2003 | Fukaya | G05B 19/40937 |
| | | | | 700/174 |
| 8,635,410 | B1* | 1/2014 | Kuskin | G06F 12/0891 |
| | | | | 711/119 |
| 2004/0039876 | A1* | 2/2004 | Nelson | G06F 3/0626 |
| | | | | 711/115 |
| 2004/0064458 | A1* | 4/2004 | Hagarty | G06F 17/30371 |
| 2005/0197723 | A1* | 9/2005 | Harada | G05B 19/4093 |
| | | | | 700/85 |
| 2008/0260294 | A1* | 10/2008 | Ogata | G11B 27/034 |
| | | | | 382/305 |

* cited by examiner

*Primary Examiner* — Jae Jeon
(74) *Attorney, Agent, or Firm* — IP Business Solutions, LLC

(57) ABSTRACT

To provide a machining program processing apparatus capable of preventing an increase in the program correction time or does not let the program correction time go to waste. A machining program processing apparatus includes: a grammar checking unit executing grammar check of a machining program; a transmission processing unit transmitting the machining program to an external device; and a deletion processing unit deleting the machining program, wherein, when a transmission request of the machining program including a grammar error is received, the transmission processing unit confirms whether the transmission is to be permitted or not.

4 Claims, 7 Drawing Sheets

FLOW OF GRAMMAR ANALYSIS
PROCESSING UNIT

FIG. 7

| PROGRAM LIST WINDOW | | | | | | | |
|---|---|---|---|---|---|---|---|
| MEM | *** | ****** | *** | 200 mm/min | | 00019 | N 00000 |
| APPARATUS | | S0% | | 0 min-1 | | | |
| | | | | 17:22:26 | | | 1/9 |

PROGRAM LIST /~20

| SELECTED GROUP | ALL PROGRAMS | NUMBER OF SELECTED PROGRAMS | 0 | | |
|---|---|---|---|---|---|

ALL PROGRAMS

| 0 NUMBER | COMMENT | ERROR CHECK | SIZE(byte) | UPDATE DATA AND TIME | STATE |
|---|---|---|---|---|---|
| 1 | | NO ERROR | 1,161 | 2007/06/07 20:10 | |
| 2 | | NO ERROR | 79 | 2007/06/07 19:30 | |
| 3 | | ERROR DETECTED | 144 | 2007/06/07 19:30 | |
| 4 | KENSA 90SEC | NO ERROR | 460 | 2007/06/07 19:30 | |
| 5 | 12T MIZO OENSA | NO ERROR | 164 | 2007/06/07 19:30 | |
| 6 | | NO ERROR | 62 | 2007/06/07 19:30 | |
| 7 | 12T TANMEN KENSA | CHECK NOT COMPLETED | 166 | 2007/06/07 19:30 | |
| 8 | | NO ERROR | 342 | 2007/06/07 19:30 | |
| 9 | | CHECK NOT COMPLETED | 66 | 2007/06/07 19:30 | |
| 10 | | NO ERROR | 208 | 2007/06/07 19:30 | |

| NC MEMORY | SIZE(byte) | NUMBER (PIECE) |
|---|---|---|
| USED | 37,489 | 86 |
| VACANT | 77,750 | 114 |

| INPUT/OUTPUT DESTINATION | MEMORY CARD | | | | | 0 CHANGE | |
|---|---|---|---|---|---|---|---|

| 0 SEARCH | PUNCH /READ | DISPLAY SWITCHING | GROUP OPERATION | | COPY | DELETE | RETURN |
|---|---|---|---|---|---|---|---|

MACHINING PROGRAM PROCESSING APPARATUS

BACKGROUND OF THE INVENTION

1. Field of the Invention

The present invention relates to a machining program processing apparatus adopted in a numerical control machine tool.

2. Description of the Related Art

A machining program in a numerical control machine tool is intended to instruct a tool trajectory, an auxiliary operation of the machine tool, and so on according to a predetermined rule. Generally, this machining program is created by a professional programmer with high level of knowledge and experience by spending much time. However, the occurrence of a program error is unavoidable, and the detection and elimination of the program error have been great burdens.

Conventional arts relating to the detection of such a program error includes, for example, an art in which a program error discrimination controlling part is divided into an input data format check part checking a format of input data and a development control check part checking a tool trajectory and a cutting condition, and when an error is detected, the checks of the input data and the development control are independently discriminated, and the position of each error is displayed with a designated color (see, for example, Japanese Patent Application Laid-open No. Sho 58-114106).

Incidentally, when a program whose program error has not been corrected is transmitted to an external device, there arises a problem that it further takes time and trouble for detecting and correcting the error. Further, the machining program is generally deleted after transmitted to and stored in an external device. However, a machining program whose program error has been corrected is sometimes deleted by mistake without being transmitted to an external device. Such deletion, if made, causes a problem of letting the time taken for the correction go to waste.

SUMMARY OF THE INVENTION

The present invention was made in consideration of the above-described conventional circumstances, and an object thereof is to provide a machining program processing apparatus capable of preventing an increase in the program correction time or not letting the program correction time go to waste.

The present invention is a machining program processing apparatus including: a grammar checking unit executing grammar check of a machining program; a transmission processing unit transmitting the machining program to an external device; and a deletion processing unit deleting the machining program, wherein, when a transmission request of the machining program including a grammar error is received, the transmission processing unit executes a warning process to confirm whether or not the transmission is to be permitted.

In the present invention, when the machining program found to include an error by the grammar check is intended to be transmitted to an external device, the warning process to confirm whether or not the transmission is to be permitted is executed. Therefore, it is possible to prevent the problem that the program correction time increases in the external device side.

In one preferred embodiment of the present invention, the transmission processing unit transmits the machining program when the transmission is permitted in response to the warning process, and ends processing when the transmission is not permitted in response to the warning process.

In this embodiment, the transmission is executed when the transmission is permitted in response to the warning process, and the processing is ended when the transmission is not permitted in response to the warning process. Therefore, the correction of the program error is not necessary or the correction time can be shortened in the external device side. That is, when the transmission of a machining program including a grammar error is permitted and this machining program is transmitted, line number or the like including the grammar error has been confirmed, which can reduce the time for detecting and correcting the error to minimum.

In another preferred embodiment of the present invention, the deletion processing unit executes a warning process to confirm whether or not the deletion is to be permitted when a deletion request of a machining program not having any transmission history after edition is received.

In this embodiment, when the machining program not having any transmission history after edition such as program correction is intended to be deleted, the warning process to confirm whether or not the deletion is to be permitted is executed, and therefore the program correction time is not let go to waste.

In still another preferred embodiment of the present invention, the deletion processing unit deletes the machining program when the deletion is permitted in response to the warning process and ends processing when the deletion is not permitted in response to the warning process.

In this embodiment, the deletion is executed when the deletion is permitted in response to the warning process. Therefore, a case where, for example, the deletion of a machining program without the transmission history is permitted and this machining program is deleted is a case having some special reason, such as a case where the machining program is not necessary any more. Therefore, the deletion causes no problem.

BRIEF DESCRIPTION OF THE DRAWINGS

FIG. 7 is a view showing a program list window.

DETAILED DESCRIPTION OF THE PREFERRED EMBODIMENTS

Hereinafter, an embodiment of the present invention will be described with reference to the attached drawings. FIG. 1 to FIG. 7 are drawings used to explain a machining program processing apparatus of a numerical control machine tool according to one embodiment of the present invention.

Figure 1:
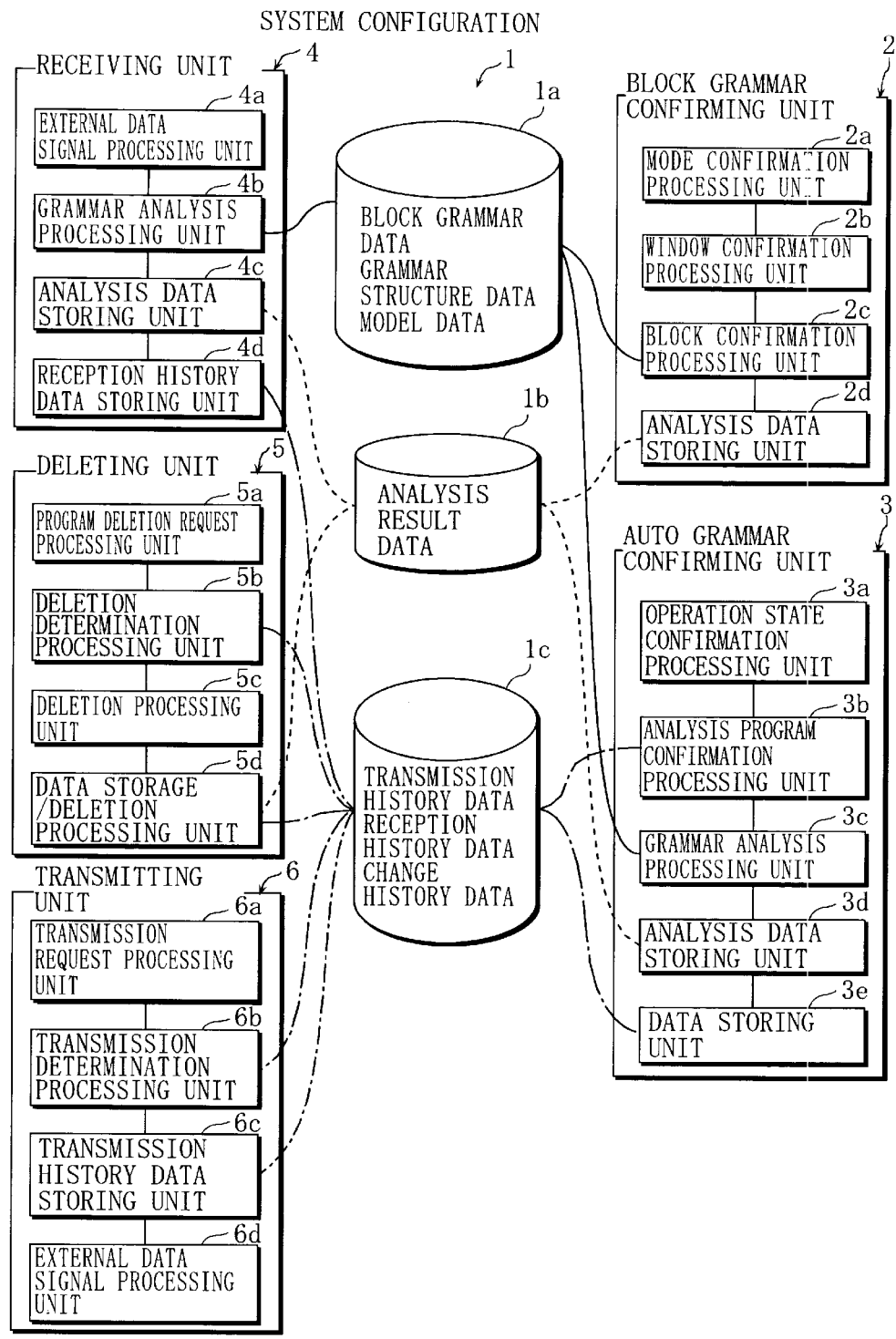
FIG. 1 is a diagram showing the system configuration of a machining program processing apparatus according to one embodiment of the present invention.

FIG. 1 shows the system configuration of the machining program processing apparatus. This system has a memory device 1, a block grammar confirming unit 2, an auto grammar confirming unit 3, a receiving unit 4, a deleting unit 5, and a transmitting unit 6.

The memory device 1 has a first memory 1a storing block grammar data and the like, a second memory 1b storing analysis result data, and a third memory 1c storing transmission history data and the like.

Figure 6:
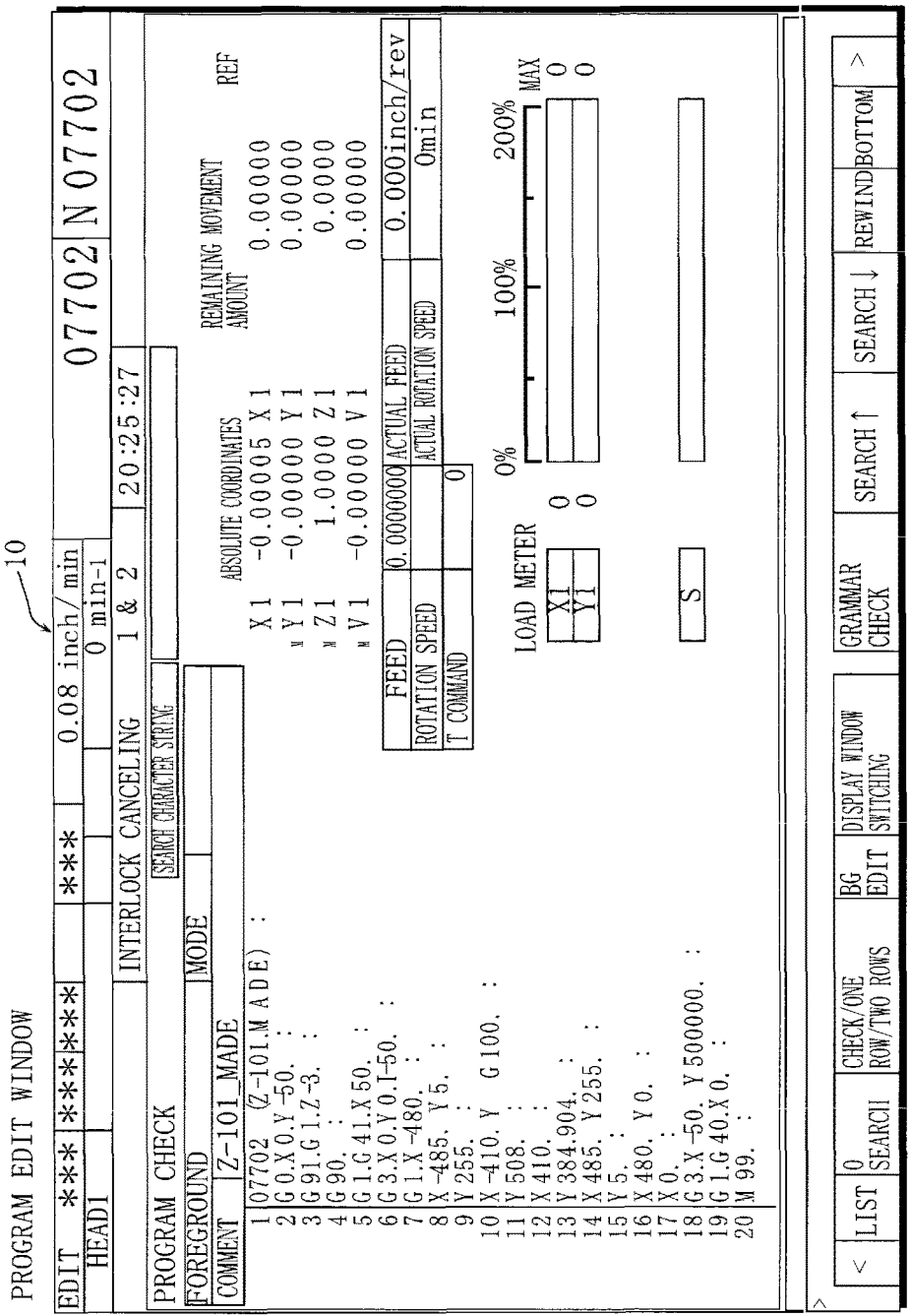
FIG. 6 is a view showing a program edit window.

In the block grammar confirming unit 2, when a mode confirmation processing unit 2a confirms that a current mode is an edit mode and a window confirmation processing unit 2b confirms that a program edit window shown in FIG. 6 is kept displayed and the edit mode has not been changed to another mode, a block confirmation processing unit 2c executes grammar check of a block by using the block grammar data, grammar structure data, model data, and the like stored in the first memory 1a, and analysis data obtained by the check is stored in the second memory 1b.

Figure 2:
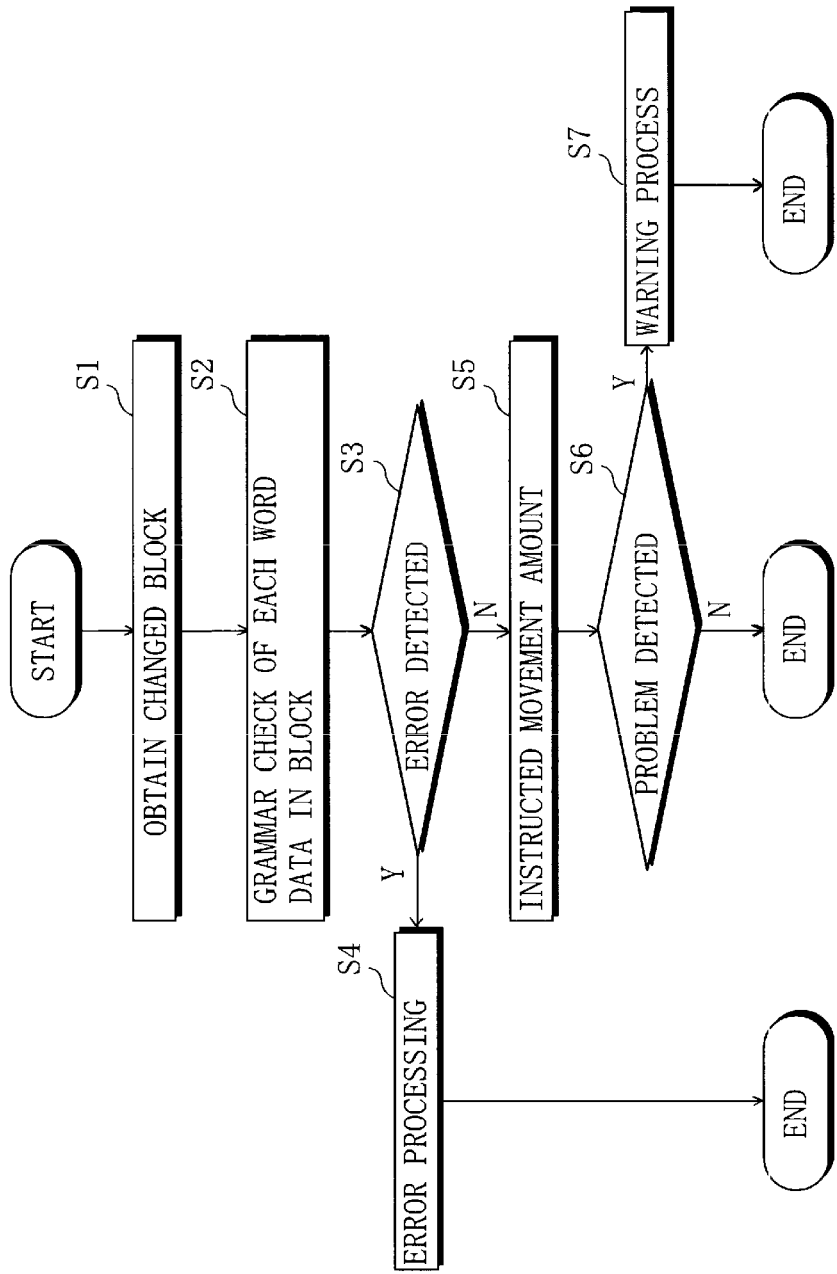
FIG. 2 is a flowchart of a block confirmation processing unit.

As shown in FIG. 2, in the block confirmation processing unit 2c, when a parameter for requesting grammar check is set and the addition, deletion, change, or the like of the program is made in the edit mode, a block in which the change or the like is made is obtained (Step S1), and the grammar check of each word data in the changed block is executed (Step S2). Then, the presence/absence of a grammar error is determined (Step S3), and when an error is detected, error processing is executed (Step S4).

When no error is detected at Step S3, an instructed movement amount is confirmed (Step S5) and the presence/absence of a problem is determined (Step S6), and when no problem is detected, analysis result data is stored in the second memory 1b, and the flow of the block confirmation process is ended. On the other hand, when some problem is detected, a warning process is executed (Step S7), in which, for example, "error detected" is displayed with a specific color on a program list window, and then the flow is ended.

Concretely, "error detected" is displayed with a character color different from that of "check not completed" on the program list window shown in FIG. 7. "Error detected" means that there is a grammatically wrong part in the program, and when the program is corrected, the check is executed block by block, and until it is confirmed that no error exists in the whole program, the "check not completed" is displayed. When it is confirmed that no error exists in the whole program, "no error" is displayed.

In the auto grammar confirming unit 3, an operation state confirmation processing unit 3a determines, for example, whether or not a current state is an idle state, or whether or not a load of computation processing is equal to or less than a predetermined value, an analysis program confirmation processing unit 3b obtains a machining program whose grammar check has not been finished, a grammar analysis processing unit 3c executes the grammar check, and the resultant analysis data is stored in the second memory 1b and check data is stored in the third memory 1c.

Figure 3:
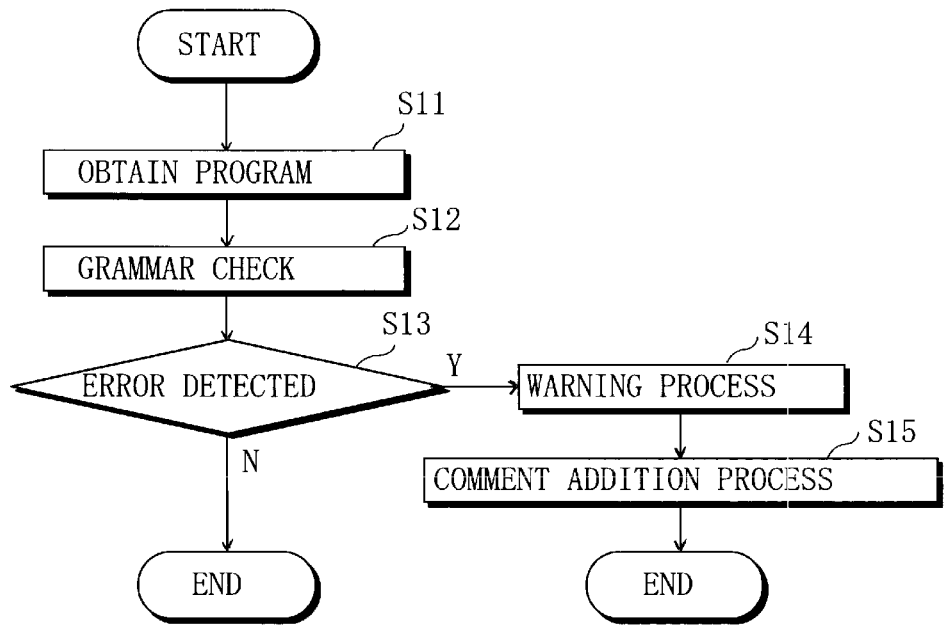
FIG. 3 is a flowchart of a grammar analysis processing unit

As shown in FIG. 3, in the grammar analysis processing unit 3c, for example, when the current state becomes the idle state while the parameter requesting the grammar check is set, a program whose grammar check has not been finished is obtained (Step S11), the grammar check of the whole machining program is executed (Step S12), the presence/absence of a program error is determined (Step S13), and when no error is detected, the flow of the grammar analysis process is ended. When an error is detected, a warning process is executed (Step S14), in which, for example, "error detected" is displayed with a specific color on the program list window, a comment addition process is executed (Step S15), in which, for example, line number including the grammar error is displayed in a comment column, and the flow is ended.

In the receiving unit 4, when an external data signal processing unit 4a receives a machining program from an external device, a grammar analysis processing unit 4b executes the grammar check, and an analysis data storing unit 4c and a reception history data storing unit 4d store the result in the second memory 1b and the third memory 1c. Incidentally, the operation in the grammar analysis processing unit 4b is the same as the operation in the grammar analysis processing unit 3c of the auto grammar confirming unit 3.

In the deleting unit 5, when a program deletion request processing unit 5a obtains a deletion request from an operator, a deletion determination processing unit 5b determines whether or not the deletion is to be permitted, a deletion processing unit 5c executes a deletion process, and a data storage/deletion processing unit 5d deletes data in the second and third memories 1b, 1c.

Figure 4:
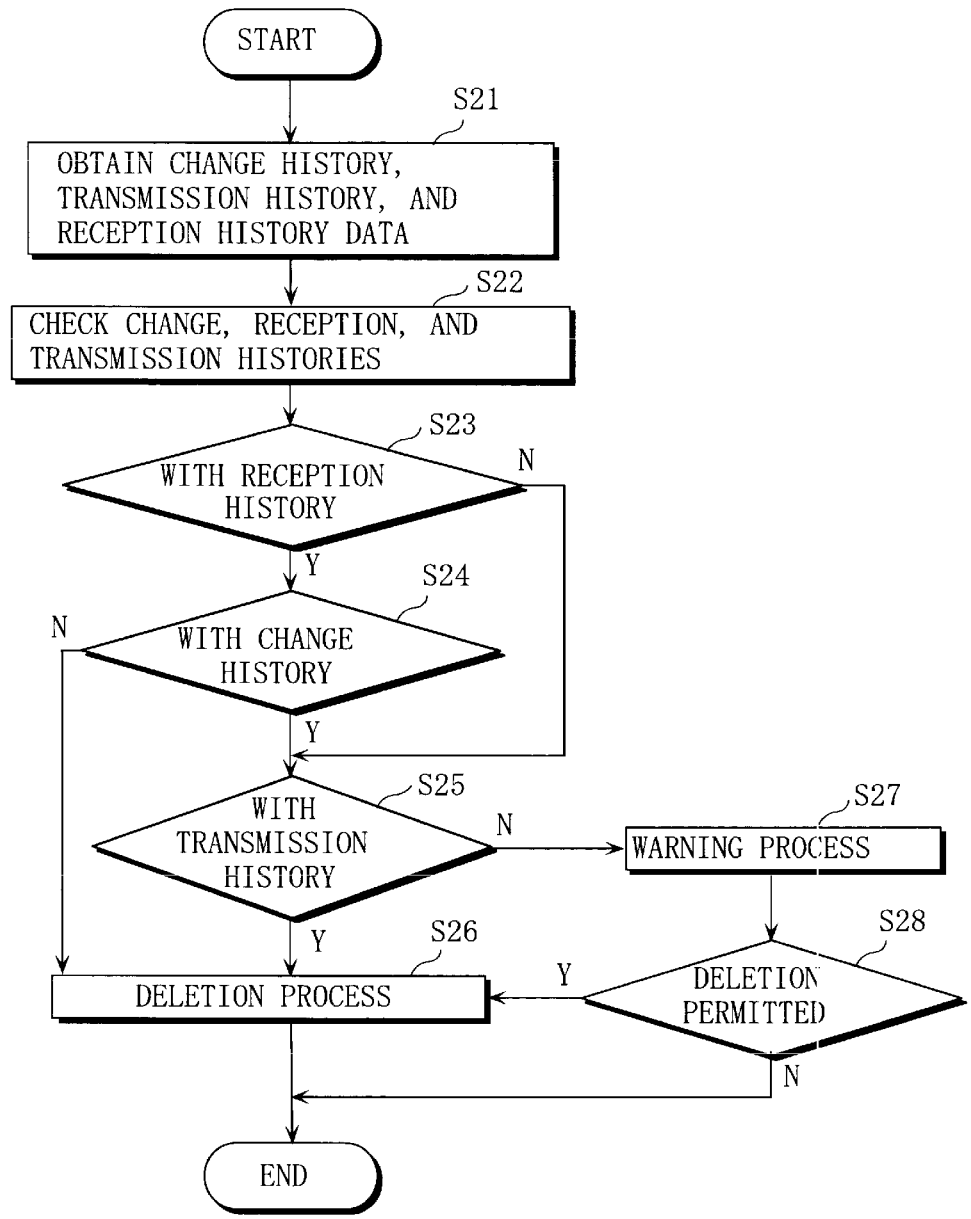
FIG. 4 is a flowchart of a deletion determination processing unit.

As shown in FIG. 4, in the deletion determination processing unit 5b, when the deletion request is received from the operator after the program is edited, change history, transmission history, reception history data are obtained (Step S21), and change, reception, transmission histories are checked (Step S22). The change history includes a history of grammar error changes which indicates that the grammar errors in the machining program have been corrected, and a history of condition changes which indicates that cutting conditions and/or tool trajectories have been changed.

Then, the presence/absence of the reception history, the change history, and the transmission history is determined (Step S23, S24, S25), and the deletion process is executed when the program has all the histories, that is, when the program has already been transmitted to an external device (Step S26). When the reception history is present but the change history is absent (Steps S23, S24), the deletion process is executed without any determination on the transmission history. Further, when the reception history is absent and the transmission history is absent, and when the reception history and the change history are present but the transmission history is absent, that is, when the program has not been transmitted to the external device, a warning process is executed (Step S27), in which the operator is given a warning that the program which has not been transmitted to the external device will be deleted. When, in response to the warning process, the operator determines that the deletion may be permitted (Step S28), the deletion process is executed (Step S26), and when the operator determines that the deletion should not be permitted, the flow is ended. Incidentally, when the operator transmits the data and this deletion process is executed again, the deletion can be immediately made.

In the transmitting unit 6, when a transmission request processing unit 6a obtains a transmission request from the operator, a transmission determination processing unit 6b determines whether or not the transmission is to be permitted, and a transmission history data storing unit 6c and an external data signal processing unit 6d store the result in the third memory 1c.

Figure 5:
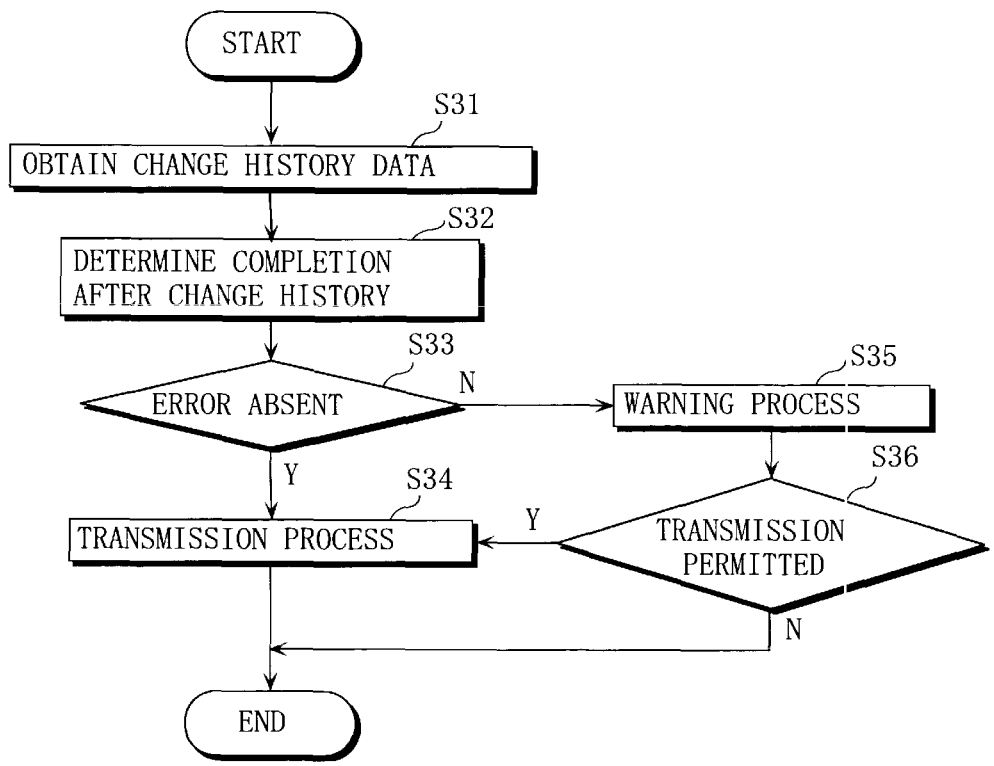
FIG. 5 is a flowchart of a transmission determination processing unit.

As shown in FIG. 5, in the transmission determination processing unit 6b, the change history data is obtained in response to the transmission request from the operator (Step S31), the completion of the program after the change history is determined (Step S32), and, for example, the presence/absence of a grammar error, or the like is determined (Step S33), and when there is no error, a transmission process is executed (Step S34). When there is an error, a warning process is executed (Step S35), in which the operator is given a warning that the program including the error will be transmitted to the external device or the like (Step S35). When, in response to the warning process, the operator gives transmission permission (Step S36), the transmission process is executed (Step S34), and when the transmission is not permitted, the flow is ended. Incidentally, when the operator transmits the data and the deletion process is executed again, the deletion can be immediately be made.

Incidentally, when the edit mode is changed to another mode during a parameter set state, the grammar check of the whole program which has been selected is executed.

Further, even when the setting of the parameter for requesting the grammar check has been cancelled, the grammar check is executed in response to ON of a "grammar check" key (see FIG. 6).

Furthermore, when the setting of the parameter is cancelled, a record of the grammar check is deleted, and therefore, when the parameter is set again, it is confirmed with the operator whether or not the grammar check of the whole program is to be executed. When it is confirmed that the grammar check is to be executed, the whole program is checked.

Further, when there is a risk of interference from a coordinate value at the time of the grammar check, the coordinate value is displayed with a changed character color to thereby instruct the operator that the coordinate value should be reconfirmed.

As described above, according to this embodiment, when some addition, deletion, change, or the like is made in the program in the edit mode, the grammar check of the relevant block is executed, which can prevent the occurrence of a grammar error without excessively increasing a computation load. Further, when a grammar error is detected, the line number including the grammar error is displayed in the comment column, which can shorten the correction time of the program.

Further, when the confirmation of the operation state shows that the load of the computation processing is equal to or more than the predetermined value, the grammar check of a program whose grammar check has not been executed is executed, which makes it possible to surely detect a grammar error without excessively increasing the computation load.

Further, since the grammar check is executed when the program edit mode is changed to another mode, the grammar check of a program edited in the edit mode can be surely executed. Incidentally, it may be made selectable whether or not the grammar check of the whole program is to be executed when the edit mode is changed to another mode.

Further, when a machining program is received from an external device, the grammar check of the machining program is executed, and therefore, it is possible to detect a grammar error of the program received from an external part, and to reduce an increase in the correction time which might be required when a machining program including a grammar error should be used.

Furthermore, the grammar check is executed at the time of the transmission of the machining program to an external part and when the transmission of a machining program including an error is instructed, the warning process to confirm whether or not the transmission is to be permitted is executed. Therefore, it is possible to prevent an increase in the program correction time in an external device and the like.

That is, since the transmission is executed after a grammar error is corrected in response to the warning process, the external device side need not correct the program error. Further, even when the transmission of a machining program including a grammar error is permitted and this machining program is transmitted, it is possible to reduce the detection and correction time of the error to minimum since the line number including the grammar error or the like has been confirmed.

Further, when a machining program having no transmission history is intended to be deleted, the warning process to confirm whether the deletion is to be permitted or not is executed. Therefore, the program correction time is not let go to waste.

That is, since a machining program is deleted when the transmission process is executed in response to the warning process, the program has been transmitted and stored in the external device and hence the deletion would cause no problem. Further, the case where the deletion of a machining program having no transmission history is permitted and this machining program is deleted is a case having some special reason such as a case where the machining program is not necessary any more, and the deletion would cause not problem.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

What is claimed is:

1. A machining program processing apparatus including a non-transitory computer readable medium comprising:
   a grammar checking unit executing a grammar check of a machining program;
   a transmission processing unit transmitting the machining program to an external device; and
   a deleting unit having a program deletion request processing unit, a deletion determination processing unit, and a deletion processing unit,
   the program deletion request processing unit to receive a deletion request of the machining program from an operator,
   the deletion determination processing unit to determine whether or not the deletion request is permitted,
   the deletion processing unit to delete the machining program,
   wherein said deletion processing unit deletes the machining program when a deletion request of the machining program being received from an operator includes a transmission history which indicates that the machining program has been transmitted to the external device, and a history of a condition change of the machining of the machining program which includes a change of a tool trajectory of a tool for machining,
   wherein said deletion determination processing unit executes a warning process to confirm whether or not the deletion is to be permitted when the deletion request of the machining program being received from the operator includes no transmission history and includes the history of the condition change,
   wherein said deletion processing unit deletes the machining program when the deletion is permitted by the operator in response to the warning process, and wherein said deletion processing unit ends processing when the deletion is not permitted by the operator in response to the warning process.

2. The machining program processing apparatus according to claim 1, wherein said deletion determination processing unit checks a reception history, the history of the condition change, and the transmission history when the deletion request is received.

3. The machining program processing apparatus according to claim 2, wherein said deletion determination processing unit executes the warning process to confirm whether or not the deletion is to be permitted after said deletion determination processing unit checks the reception history, the history of the condition change, and the transmission history.

4. The machining program processing apparatus according to claim 2, wherein said deletion processing unit continues to execute the deletion process when the deletion determination processing unit has checked the reception history, the history of the condition change, and the transmission history.

* * * * *